July 18, 1950     R. A. W. SPOONER     2,515,807
COUPLING PIN
Original Filed Jan. 5, 1943
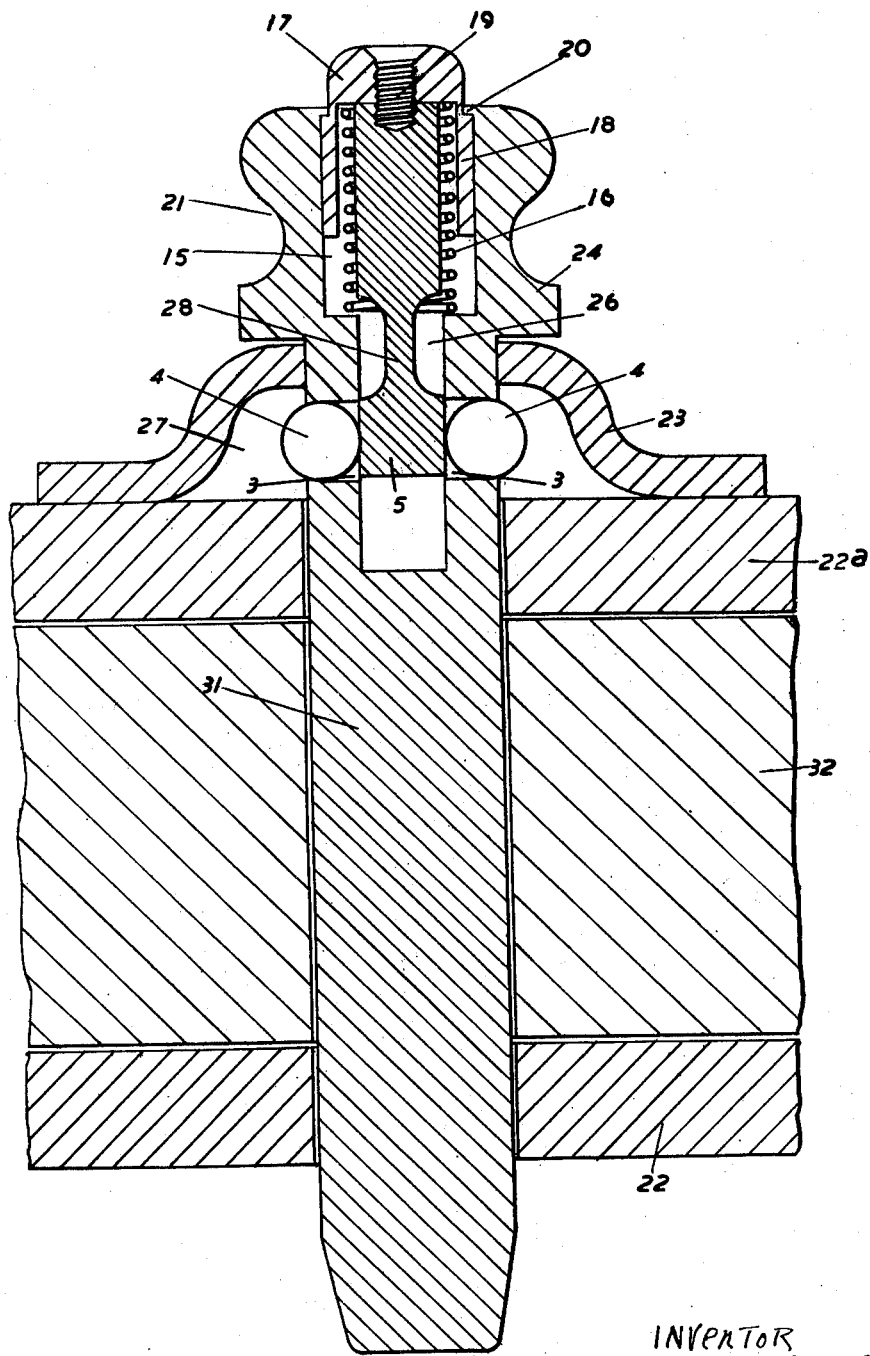
INVENTOR
Reginald Arthur William Spooner
by Henry I. Horridge
Attorney Patented July 18, 1950

2,515,807

UNITED STATES PATENT OFFICE 2,515,807

COUPLING PIN

Reginald Arthur William Spooner,
Walton-on-Thames, England

Original application January 5, 1943, Serial No. 471,376, now Patent No. 2,399,581, dated April 30, 1946. Divided and this application March 19, 1946, Serial No. 655,518. In Great Britain January 28, 1942

1 Claim. (Cl. 85—5)

This invention relates to coupling pins, such for example as pins used for coupling vehicles together.

This case is a division of application Serial No. 471,376, filed January 5, 1943, which has now matured into Patent No. 2,399,581 of April 30, 1946.

One object of the invention is to provide an improved means of locating and retaining a coupling pin in position axially.

Another object of the invention is to lock a coupling pin firmly in position while allowing it to be quickly released when desired.

A further object of the invention is to provide a coupling pin of which the part engaging the coupled members develops its full strength, and which will remain firmly locked in position but can easily be inserted and released.

In my present invention I make use of a principle of operation embodied in the device described in my British Patent No. 524,297, that is to say, I employ a tubular member containing one or more balls or the equivalent mounted to move in a radial bore or bores, and these balls are caused to project out from the tubular member to form abutments by the action of a spring-loaded member that is axially movable in the tubular member and that, on being moved against the spring, allows the balls to move inwards and cease to act as abutments.

The manner in which the objects of the present invention are attained will best be understood from the following description of an embodiment of it when taken in conjunction with the annexed drawing, which is a vertical section through a vehicle coupling pin.

In the construction shown in the drawing, the pin consists of a long plain shank 31 with a head 24, and is shown in position in a towing attachment for a vehicle. The shank enters openings in the arms 22a and 22 of the forked end of one of the elements to be coupled and an eye in the other member 32 which lies between the two forked arms. A dome-shaped member 23 is welded to the upper surface of the arm 22a so as to form above that surface a cavity 27 into which two balls 4 project to lock the pin in position. These balls 4 can move in radial bores 3 in the pin but are restrained from escaping outwards completely because the mouths of the bores 3 are spun over. As before, the balls 4 are forced to project outwards by a member 5 which can move axially in a bore 26 in the head of the pin and which is formed with a waist 28. The upper part of the member 5 is surrounded by a spring 16 within an enlarged part 15 of the bore 26 and is secured by a screw 19 to a cap 17 having a skirt 18 formed with a shoulder which engages under an internal flange 20 at the mouth of the part 15 of the bore 26. When axial pressure is applied to the cap 17 the member 5 moves downwards to bring the waisted part 28 opposite the balls 4 so that the latter can sink inwards in the radial bores 3. When they do this, the pin can easily be inserted and withdrawn and when the cap 17 is released again the spring 16 will restore the member 5 to its normal position, thus once more forcing the balls 4 outwards.

To facilitate operation a groove 21 is made around the head of the pin so that the operator's fingers can engage in this while his thumb bears on the cap 17.

It will be seen that the arm 22a and dome-shaped member 23 together constitute an element with an internally recessed cylindrical opening that is entered by the coupling pin.

It will also be seen that the whole of the retaining mechanism is accommodated in the head of the pin and that the shank may be of any desired length and is not weakened by an internal bore. The application of the dome-shaped member or its equivalent to the surface of the coupled element is a very simple matter.

What I claim is:

In combination, a coupling pin, a pair of elements coupled by said pin, and a recessed element fixed to a surface on one of said elements and having an opening registering with the opening of said element entered by said pin, whereby a cavity is formed between said surface and said recessed element, said pin being formed in its head with a bore and with at least one radial opening in the wall of said bore, a member mounted to move radially in said bore to project from the surface of said pin into said cavity, an operating member mounted to move axially in said bore and shaped to force said radially movable member to project outwards but on being moved axially to allow said radially movable member to sink inwards, and spring means for holding said operating member in position to force said radially movable member outwards, the shank of said pin engaging said coupled elements being formed with a continuous cylindrical surface without openings.

REGINALD ARTHUR WILLIAM SPOONER.

REFERENCES CITED

The following references are of record in the file of this patent:

UNITED STATES PATENTS

| Number | Name | Date |
|---|---|---|
| 854,073 | Bruckner et al. | May 21, 1907 |
| 1,372,242 | Mepsted | Mar. 22, 1921 |
| 2,313,883 | Lowther | Mar. 16, 1943 |